(12) United States Patent
Chuang

(10) Patent No.: US 12,413,601 B2
(45) Date of Patent: Sep. 9, 2025

(54) PROTECTING AGAINST DKIM REPLAY

(71) Applicant: Google LLC, Mountain View, CA (US)

(72) Inventor: Wei-haw Chuang, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 173 days.

(21) Appl. No.: 18/478,989

(22) Filed: Sep. 29, 2023

(65) Prior Publication Data

US 2024/0113893 A1 Apr. 4, 2024

Related U.S. Application Data

(60) Provisional application No. 63/378,145, filed on Oct. 3, 2022.

(51) Int. Cl.
*H04L 9/40* (2022.01)
*H04L 9/32* (2006.01)

(52) U.S. Cl.
CPC .......... *H04L 63/126* (2013.01); *H04L 9/3247* (2013.01); *H04L 63/123* (2013.01)

(58) Field of Classification Search
CPC ...................... H04L 63/12–126; H04L 9/3247
See application file for complete search history.

(56) References Cited

U.S. PATENT DOCUMENTS

| | | | | |
|---|---|---|---|---|
| 10,673,636 B1* | 6/2020 | Finke | | H04L 9/3247 |
| 11,212,245 B1* | 12/2021 | Ding | | H04L 63/1483 |
| 12,149,633 B2* | 11/2024 | Chuang | | G06F 21/645 |
| 2019/0319905 A1* | 10/2019 | Baggett | | H04L 51/212 |
| 2020/0274717 A1* | 8/2020 | Finke | | H04L 63/08 |
| 2021/0152610 A1* | 5/2021 | Fryback | | H04L 51/212 |
| 2025/0062914 A1* | 2/2025 | Chuang | | H04L 63/168 |

OTHER PUBLICATIONS

Bart Butler: "How Proton helped Gmail overcome a DKIM replay attack | Proton Mail", Aug. 15, 2022 (Aug. 15, 2022, XP093107011. URL: https://web.archive.org/web/20220815055854/https://proton.me/blog/dkim-replay-attack-breakdown.

(Continued)

*Primary Examiner* — Boris D Grijalva Lobos
(74) *Attorney, Agent, or Firm* — Honigman LLP; Brett A. Krueger

(57) ABSTRACT

A method for securing messages includes obtaining, at a first message server, a message for a user of a message service hosted by the first message server, the message including a header including a digital signature signed by an author of the message and a list of one or more recipients of the message. The method includes determining that a Domain Name System (DNS) TXT record associated with the message includes a delegation policy indicating that a second message server declared all intended recipients of the message. In response, the method includes determining that the digital signature by the author is valid and that the user is a declared recipient of the message. The method includes, in response to determining that the digital signature by the author is valid and the user is the declared recipient of the message, indicating the message is authentic.

20 Claims, 9 Drawing Sheets

(56) References Cited

OTHER PUBLICATIONS

Crocker D et al: "DomainKeys Identified Mail (DKIM) Signatures; rfc63763txt", Domain Keys Identified Mail (DKIM) Signatures; RFC6376.TXT, Internet Engineering Task Force, IETF; Standard, Internet Society (ISOC) 4, Rue Des Falaises CH—1205 Geneva, Switzerland, Sep. 21, 2011 (Sep. 21, 2011), pp. 1-76 XP015081300.
Brian Godiksen: "DKIM Replay Attacks | Preventive Measures | Socketlabs", socketlabs, Feb. 14, 2022 (Feb. 14, 2022), XP093106972, URL:https://www.socketlabs.com/blog/dkim-replay-attacks-preventive-measures-to-protect-email-deliverability.
Anders Berggren: "The DKIM replay attack, and how to mitigate—Halon", Apr. 28, 2022 (Apr. 28, 2022) XP093107078, URL:https://halon.io/blog/the-dkim-replay-attack-and-how-to-mitigate.
International Search Report in related PCT Application No. PCT/US2023/034239, dated Dec. 15, 2023.

\* cited by examiner

PROTECTING AGAINST DKIM REPLAY

CROSS REFERENCE TO RELATED APPLICATIONS

This U.S. patent application claims priority under 35 U.S.C. § 119(e) to U.S. Provisional Application 63/378,145, filed on Oct. 3, 2022. The disclosure of this prior application is considered part of the disclosure of this application and is hereby incorporated by reference in its entirety.

TECHNICAL FIELD

This disclosure relates to DomainKeys Identified Mail (DKIM) signatures.

BACKGROUND

DomainKeys Identified Mail (DKIM) is an email authentication standard or method designed to provide authenticity of messages (i.e., by ensuring that the message has not been altered in transit). It uses public-key cryptography to sign some or all of a message with a private key. Recipients of the message may verify the authenticity of the message using a corresponding public key of the sender (e.g., by looking up the sender's public key published via the Domain Name System (DNS)). While DKIM provides authenticity protection, it is still vulnerable to replay attacks and also commonly disrupts mailing and forwarding lists.

SUMMARY

One aspect of the disclosure provides a computer-implemented method for securing messages that when executed by data processing hardware causes the data processing hardware to perform operations. The operations include obtaining, at a first message server, a message for a user of a message service hosted by the first message server. The message is from a second message server hosting a second message service. The message includes a header, and the header includes a digital signature signed by an author of the message and a list of one or more recipients of the message. The operations include determining that a Domain Name System (DNS) TXT record associated with the message includes a delegation policy indicating that the header declared all intended recipients of the message. In response to determining that the DNS TXT record includes the delegation policy, the operations include determining that the digital signature by the author is valid and determining, using the list of one or more recipients, that the user is a declared recipient of the message. In response to determining that the digital signature by the author is valid and the user is the declared recipient of the message, the operations include indicating the message is authentic.

Implementations of the disclosure may include one or more of the following optional features. In some implementations, the operations further include obtaining, at the first message server, a second message intended for a second user of a third message service hosted by a third message server; indicating, via an Authenticated Received Chain (ARC) header, that the third message server fails to declare all recipients of messages; and transmitting the second message to the third message server.

In some examples, the operations further include receiving, at the first message server, from a third message server, a second message for the user of the message service hosted by the first message server; determining that the second message is an indirect message; and responsive to determining that the second message is an indirect message, applying an indirect message policy to the second message. In some of these examples, determining that the second message is an indirect message includes determining a misalignment between a DomainKeys Identified Mail (DKIM) authentication and a sender policy framework (SPF) authentication. In some of these examples, the indirect message policy includes one of rejecting the second message or quarantining the second message.

Optionally, the operations further include obtaining, at the first message server, a second message intended for a second user of a third message service hosted by a third message server, the second message comprising a second header; updating, based on the third message server, the second header to indicate that all intended recipients of the second message are declared; and transmitting the second message to the third message server. Updating the second header may include adding a forwarded-to declaration.

In some implementations, the operations further include receiving, at the first message server, from a third message server, a second message for the user of the message service hosted by the first message server; retrieving domain information associated with the third message server; and determining that the second message is authentic based on the domain information. In some of these implementations, retrieving the domain information includes retrieving a public key certificate associated with the third message server. In at least one of these implementations, the domain information includes a threshold message recipient quantity and determining that the second message is authentic includes determining that a quantity of recipients receiving the second message satisfies the threshold message recipient quantity.

Another aspect of the disclosure provides a system for securing a message. The system includes data processing hardware and memory hardware in communication with the data processing hardware. The memory hardware stores instructions that when executed on the data processing hardware cause the data processing hardware to perform operations. The operations include obtaining, at a first message server, a message for a user of a message service hosted by the first message server. The message is from a second message server hosting a second message service. The message includes a header, and the header includes a digital signature signed by an author of the message and a list of one or more recipients of the message. The operations include determining that a Domain Name System (DNS) TXT record associated with the message includes a delegation policy indicating that the header declared all intended recipients of the message. In response to determining that the DNS TXT record includes the delegation policy, the operations include determining that the digital signature by the author is valid and determining, using the list of one or more recipients, that the user is a declared recipient of the message. In response to determining that the digital signature by the author is valid and the user is the declared recipient of the message, the operations include indicating the message is authentic.

This aspect may include one or more of the following optional features. In some implementations, the operations further include obtaining, at the first message server, a second message intended for a second user of a third message service hosted by a third message server; indicating, via an Authenticated Received Chain (ARC) header, that the third message server fails to declare all recipients of messages; and transmitting the second message to the third message server.

In some examples, the operations further include receiving, at the first message server, from a third message server, a second message for the user of the message service hosted by the first message server; determining that the second message is an indirect message; and responsive to determining that the second message is an indirect message, applying an indirect message policy to the second message. In some of these examples, determining that the second message is an indirect message includes determining a misalignment between a DomainKeys Identified Mail (DKIM) authentication and a sender policy framework (SPF) authentication. In some of these examples, the indirect message policy includes one of rejecting the second message or quarantining the second message.

Optionally, the operations further include obtaining, at the first message server, a second message intended for a second user of a third message service hosted by a third message server, the second message comprising a second header; updating, based on the third message server, the second header to indicate that all intended recipients of the second message are declared; and transmitting the second message to the third message server. Updating the second header may include adding a forwarded-to declaration.

In some implementations, the operations further include receiving, at the first message server, from a third message server, a second message for the user of the message service hosted by the first message server; retrieving domain information associated with the third message server; and determining that the second message is authentic based on the domain information. In some of these implementations, retrieving the domain information includes retrieving a public key certificate associated with the second message server. In at least one of these implementations, the domain information includes a threshold message recipient quantity and determining that the second message is authentic includes determining that a quantity of recipients receiving the second message satisfies the threshold message recipient quantity.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

DomainKeys Identified Mail (DKIM) is an email authentication standard or method designed to provide authenticity of messages (i.e., by ensuring that the message has not been altered in transit). It uses public-key cryptography to sign some or all of a message with a private key. Recipients of the message may verify the authenticity of the message using a corresponding public key of the sender (e.g., by looking up the sender's public key published via the Domain Name System (DNS)). While DKIM provides authenticity protection, it is still vulnerable to replay attacks and also commonly disrupts mailing and forwarding lists. In a replay attack, a malicious user sends a message (e.g., spam) through a message transfer agent (MTA) that digitally signs the message, banking on the reputation of the signing domain (e.g., a large popular mailbox provider) rather than its own, and then re-sends that message to a large number of intended recipients. The recipients observe the valid signature from the well-known domain, elevating their trust in the message and increasing the likelihood of delivery and presentation to the user.

Because DKIM (and Simple Mail Transfer Protocol (SMTP)) permits sending emails to recipients unspecified in the message body or header, DKIM cannot provide replay protection. Moreover, because DKIM operates by signing a header and a body of a message, any modification to the header or the body breaks the cryptographic signature. Thus, forwarding an email, for example, which typically modifies the subject of the message (e.g., by prepending "Fwd:") causes DKIM to fail.

Implementations herein are directed toward a message protocol that improves the replay protection of standards such as DKIM and/or provides forwarding/mailing list modification capabilities. The protocol may include explicitly declaring all recipients, even traditionally "hidden" recipients such as for blind carbon copy (BCC) recipients. When a user receives a message and verifies, via the header of the message, that the user is not a declared recipient of the message, the user may be alerted to a potential replay attack. In some examples, the protocol includes issuing challenge requests to a sender of a message. The challenge request challenges the sender to verify that the sender is the author of the email by signing another message with the same key used to sign the original message. In some implementations, the protocol includes capabilities for allowing changes to the header and/or body of the message while still maintaining the authenticity of the original email. For example, a message server alters the subject of the message (e.g., by adding "Fwd:" to a subject of the message) and then digitally sign the edited message. The message server may transmit the message with both the original signature, the new signature, and a description of the change, allowing the recipient to verify the original message and the edit via the original signature and the new signature.

Figure 1:
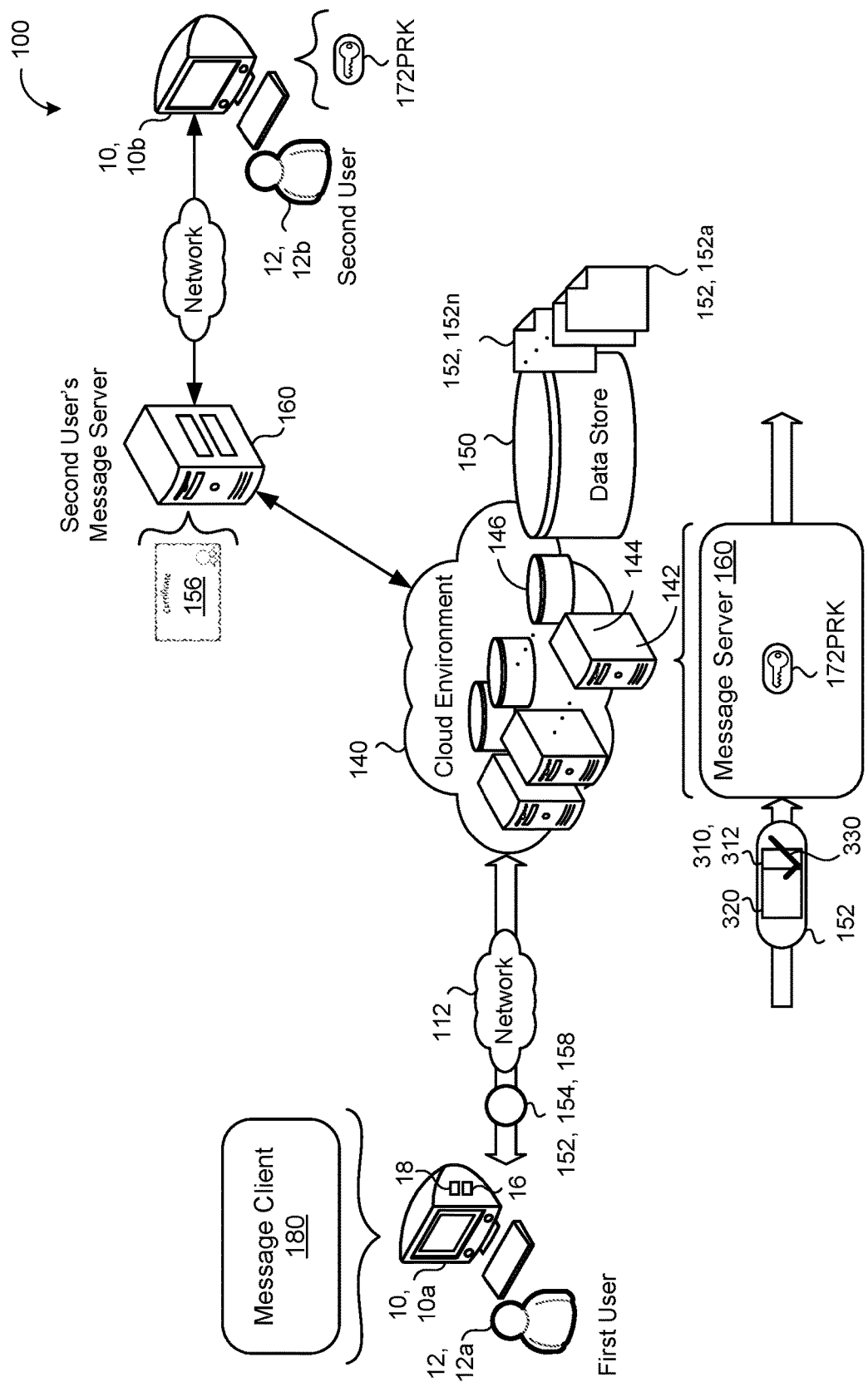
FIG. 1 is a schematic view of an example system for securing a message.

Referring now to FIG. 1, in some implementations, an example message protection system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a plurality of messages 152, 152a-n. In some examples, the messages 152 include emails, but any other sort of communications may also be stored (e.g., any textual, audio, and/or video messages). The data store 150 may store any number of messages 152 at any point in time.

The remote system 140 executes a message server 160. The message server 160 (e.g., an email server or mail server) is configured to receive messages 152 from users 12 (via a user device 10) and deliver the messages 152 to other users 12. For example, the message server 160 includes an email server that sends and receives emails. The message server 160 may use any conventional techniques for sending and receiving messages 152 (e.g., SMTP, Post Office Protocol version 3 (POP3), Internet Message Access Protocol (IMAP), HTTPS API, a custom protocol, etc.) and may include any number of sub-components (e.g., incoming message servers, outgoing message servers, list servers, policies, webmail servers, etc.).

The message server 160 is configured to receive messages 152 from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). In some implementations, a first user device 10, 10a of a first user 12, 12a executes a message client 180. The user 12 may draft and transmit the message 152 to the message server using a web browser, a standalone application executing on the user device 10, or any other suitable means. For example, the user 12 interacts with the message client 180 (e.g., via a graphical user interface executing on the user device 10) to send and receive messages 152 from the message server 160. The message client 180 may execute locally on the user device 10 (e.g., as a stand-alone application) or may execute on the remote system 140 and be accessed by the user device 10 (e.g., using a browser) via the network 112.

The message server 160 obtains a message 152 to be delivered to the first user 12a. Here, the first user 12a is a customer or client of a message service hosted by the message server 160. The message 152 is obtained from, for example, a second user 12, 12b using a second user device 10, 10b. The second user 12b may use a different message server 160 or the same message server 160 as the first user 12a. The message 152 includes a header 310 and a body 320. The header 310 includes information for message delivery while the body 320 includes the communication information of the message 152. The header 310 includes a list of one or more intended recipients 312 of the message 152. The list of recipients 312 indicates one or more users 12 who are intended to receive the message 152 by an original author of the message 152. The header 310 can also include a variety of other information (e.g., sender information, subject, etc.). The header 310 also includes a cryptographically-based digital signature 330 signed by the author of the message 152 (e.g., the second user 12b). As used herein, a message signed by the author of the message 152 includes the message signed by an agent of the author (e.g., a messaging service on behalf of the author such as by message server 160). In some examples, the message 152 is digitally signed using the DKIM email security standard. The digital signature 330 may sign just the header 310 or a combination of the header 310 and the body 320. The digital signature 330 provides authenticity of the header 310 and/or body 320. That is, the digital signature 330 allows for mathematical verification that the signed data (e.g., the header 310) has not been changed since the digital signature 330 was applied and that the digital signature 330 was applied by a known sender.

In some implementations, the digital signature 330 employs asymmetric cryptography. For example, the author of the message 152 "signs" (i.e., encrypts) the header 310 (e.g., a hash of the header) using a private key 172PRK. The digital signature 330 is validated (e.g., by the message server 160) by using a public key 172PK associated with the private key 172PRK used with the digital signature 330. For example, the message server 160, when receiving a message 152 with a digital signature 330, verifies or validates the digital signature 330 by retrieving the public key 172 PK (e.g., using Domain Name System (DNS)). Once the digital signature 330 is verified and/or validated, the message server 160 can be reasonably certain that the owner of the private key 172PRK signed the message 152 and that the message 152 has not been altered in transit.

The message server 160, in some implementations, determines, using the list of one or more intended recipients 312, whether the first user 12a is a declared recipient 312 of the message 152. That is, the message server 160 determines whether an identity or address (e.g., an email address) of the first user 12a appears within the list of intended recipients 312 within the header 310 of the message 152. When the digital signature 330 by the author of the message 152 is valid and the user 12 is a declared recipient on the list of one or more recipients 312 of the message 152, the message server 160, in some implementations, indicates that the message 152 is authentic. For example, the message server 160 delivers the message 152 to the first user device 10a of the first user 12a. The message server 160, additionally or alternatively, categorizes, forwards, or otherwise handles the message 152 as if the message 152 is authentic. When the digital signature 330 by the author of the message 152 is valid, but the user 12 is not a declared recipient on the list of one or more recipients 312 of the message 152, the message server 160 may determine an indication of a replay attack. In this scenario, the message server 160 may indicate the message is inauthentic. For example, the message server 160 alerts the first user 12a (e.g., that the message 152 may be a replay attack). In some examples, the message server 160 quarantines the message 152 (e.g., by routing the message 152 to a spam folder or otherwise designating the message 152 as inauthentic and/or spam) or delivers the message 152 with a warning or notification of the potential danger. In other examples, the message server 160 discards the message 152 entirely. Additionally or alternatively, the message server 160 flags the message 152, categorizes the message, or any other action that indicates the message 152 is or may be inauthentic.

Figure 2:
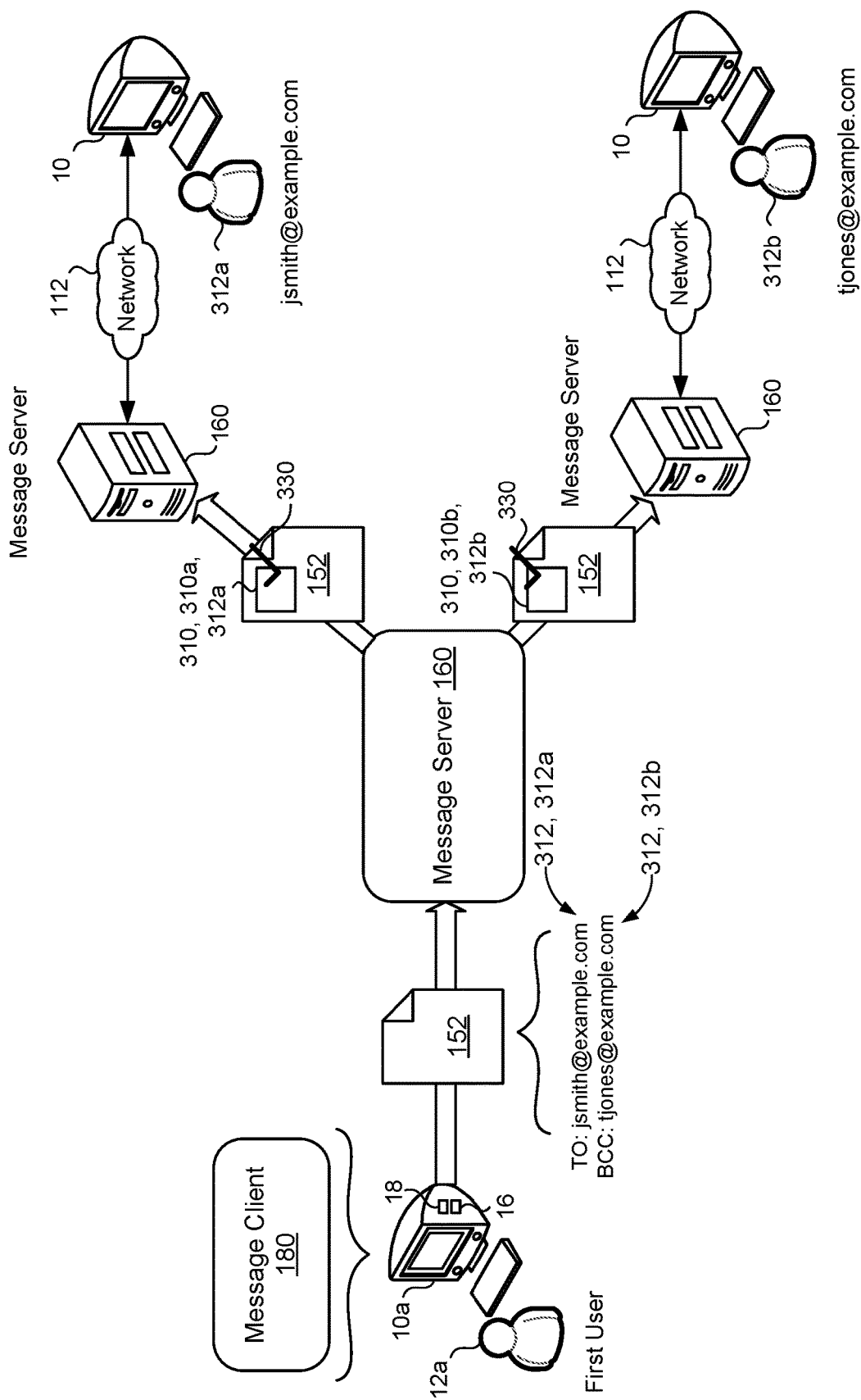
FIG. 2 is a schematic view of a system for distributing messages to private and non-private recipients.

Referring now to FIG. 2, by ensuring that the user 12 is an intended recipient 312 of the message 152, the message server 160 reduces exposure to replay attacks. However, in some scenarios, explicitly declaring all intended recipients 312 in the header 310 of the message 152 lacks desired privacy. For example, when an intended recipient 312 is included on a blind carbon copy (BCC) field of an email, it is often desired by the author that other recipients (i.e., on the "TO" field or the carbon copy (CC) field) are not aware of the recipients on the BCC field. In order to explicitly declare all recipients 312 while maintaining privacy, the message server 160, in some implementations, receives, from the first user device 10a of the first user 12a, a message 152 for transmission to both a first recipient 312, 312a and a second recipient 312, 312b. In this example, the first recipient 312a is a non-private recipient 312 (e.g., is included in the "TO" or "CC" field of an email) while the second recipient 312b is a private recipient 312 (e.g., is included in the "BCC" field of an email).

The message server 160, in some examples, generates a first header 310, 310a that includes the first recipient 312a (i.e., the non-private recipient 312) and a second header 310, 310b that includes the second recipient 312b (i.e., the private recipient 312). While in this example, there is a single non-private recipient 312 and a single private recipient 312, a message 152 may include any number of non-private recipients 312 and private recipients 312. The message server 160 may generate a single header 310 that includes each of the non-private recipients 312 and a separate header for each private recipient 312. For example, with ten non-private recipients 312 and ten private recipients, the message server 160 generates eleven headers 310 (one header 310 for the ten non-private recipients 3120 and a separate header 310 for each private recipient 312). The non-private recipients 312 may or may not be included on the headers 310 for the private recipients 312.

Continuing with the example of FIG. 2, the message server 160 digitally signs the first header 310a with the digital signature 330 of the author of the message 152 (i.e., the first user 12a in this example). The message server 160 digitally signs the second header 310b with the digital signature 330 (i.e., another digital signature using the same private key 172PRK). The message server 160 transmits the message 152 with the first header 310a to the first recipient 312a and also transmits the message 152 with the second header 310b to the second recipient 312b. When the first recipient 312a receives the message 152 (e.g., from a separate message server 160 or the same message server 160 or any other conventional means for receiving the message 152), the first recipient 312a may verify that they are a declared recipient 312 via the first header 310a and is not aware that the second recipient 312b received the same message 152. Likewise, when the second recipient 312b receives the message 152, the second recipient 312b may verify that they are a declared recipient 312 via the second header 310b without revealing the second recipient 312b to the first recipient 312a. The second header 310b may include the first recipient 312a (as the first recipient 312a is non-private) in addition to the second recipient 312b.

Figure 3:
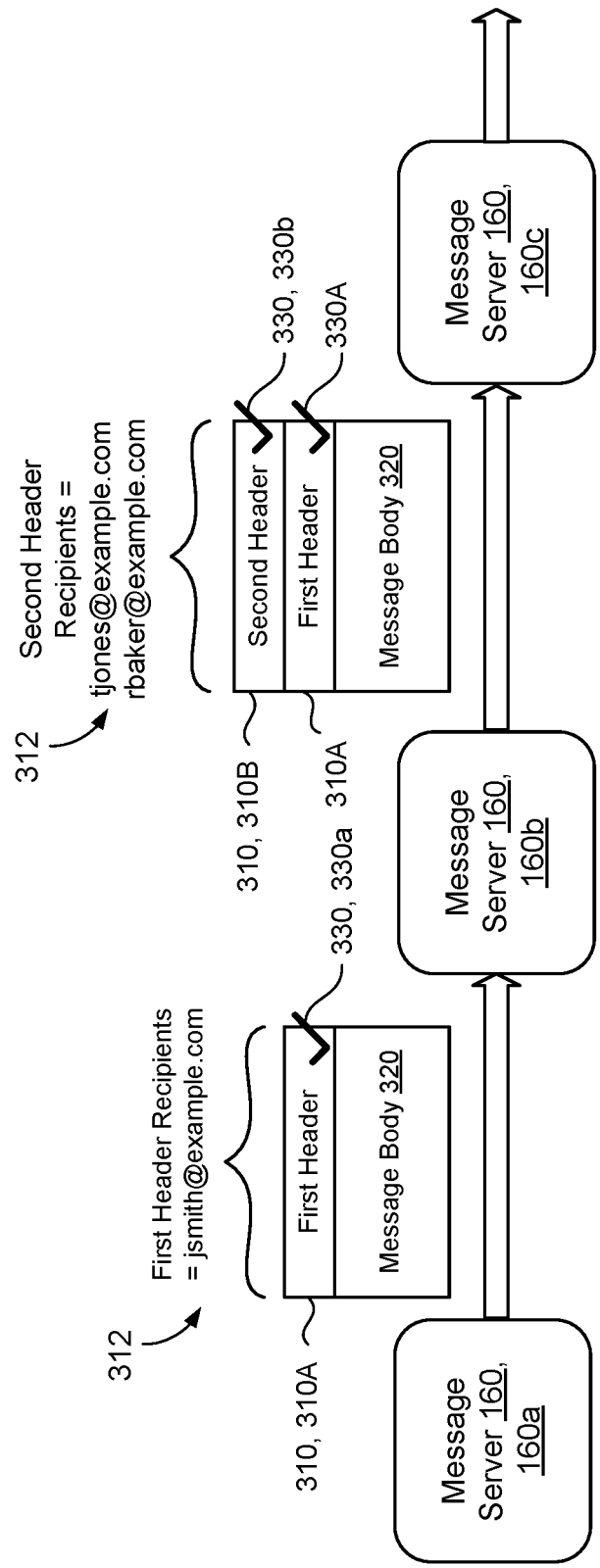
FIG. 3 is a schematic view of message headers of messages.

Referring now to FIG. 3, in some implementations, the message 152 includes multiple headers 310, 310A-N with subsequent headers 310 after the first header digitally signed by a subsequent distributor of the message 152. The subsequent headers 310 include a list of one or more subsequent recipients 312 of the message. In these implementations, the message server 160 determines whether the user 12 receiving the message 152 is a declared recipient of the one or more subsequent recipients 312 of the message. For example, and as illustrated in FIG. 3, a first user 12 sends a message 152 with a first header 310A to a second user 12 (i.e., jsmith@example.com). The first header includes a first digital signature 330, 330a. Here, the first user 12 sends the message 152 from a first message server 160, 160a to a second message server 160, 160b associated with the second user 12. The first header 310A declares the second user 12 as an intended recipient 312. The second user 12 then forwards the message 152 to a third user (i.e., tjones@example.com) and a fourth user 12 (i.e., rbaker@example.com) by sending the message 152 to a third message server 160, 160c. The second user 12, in addition to the first header 310A, includes a second header 310B with the message 152. The second header 310B is digitally signed by the second user 12 using a second digital signature 330, 330b and includes the third user 12 and the fourth user 12 as intended recipients 312. In this scenario, the third user 12, after receiving the message 152, verifies that the third user 12 is an intended recipient 312 of the second header 310B. The third user 12 can further verify that the sender of the message 152 (i.e., the second user 12 who digitally signed the second header 310B) is an intended recipient 312 of the original message (i.e., via the first header 310A).

This process may repeat for any number of times the message 152 is forwarded to further recipients 312 (each time adding a layer to the header 310). For example, the third user 12 and/or the fourth user 12 forwards the message 152 on to a fifth user 12 using the first header 310A, the second header 310B, and a third header 310 (not shown) that includes the new recipients. The third header 310 is digitally signed by the distributor so that the subsequent recipients 312 can verify the "chain" of headers 310 back to the original author of the message 152. In some implementations, the subsequent headers 310 include an increment indicating a number of times the message 152 has been forwarded (e.g., an instance number or set number for the Authenticated Received Chain (ARC) protocol). For example, the second header 310B includes an increment indicating the message 152 has been forwarded one time (e.g., i=1), while the third header 310 includes an increment indicating the message 152 has been forwarded two times (e.g., i=2). Additionally or alternatively, the message server 160 uses ARC headers to assist in detecting replay attacks or other inauthentic messages 152. Each ARC set includes three headers: an ARC-Seal header, an ARC-Authentication-Results header, and an ARC-Message-Signature header. In some implementations, messages 152 are originally authored using only the ARC-Seal header and the ARC-Message-Signature header (i.e., without the ARC-Authentication-Results header). In these implementations, forwarded messages 152 (i.e., when the forwarded is not the original author of the message 152) include all three headers, and final recipients 312 of the message 152 only include the ARC-Seal header and the ARC-Message-Signature header (i.e., without the ARC-Authentication-Results header). In this scenario, when a message server 160 determines that a forwarded message 152 includes an intermediary with only the first two headers (i.e., an ARC-Seal header and an ARC-Message-Signature header), then the message server 160 may flag the message as potentially inauthentic.

It is possible that a malicious actor (e.g., a spammer) may attempt to take advantage of when a sender that implements the enhanced security protocols (i.e., is "aware") as discussed herein sends a message 152 to an unaware receiver (i.e., a receiver who does not implement the enhanced security protocols) and thus capture a DKIM replay sample there. In some implementations, this is mitigated by identifying the unaware receiver but declaring and signing in all cases the recipient 312. If the message 152 is captured by a spammer and replayed, then the unaware forwarder's domain may be adjusted, and not the originator's domain who is not at fault. In these implementations, DKIM replay resistant domains are protected while unaware domains or message servers 160 still subject to DKIM replay will be impacted.

For example, a first message server 160 sends a message 152 to a second message server 160, where the first message server 160 is aware and the second message server 160 is unaware. Even if the recipient 312 that uses the second message server 160 is already declared in the "to" or "cc" fields, the first message server 160 may also add a Forwarded-To header to indicate this message was sent to a user 12 on an unaware domain. Notably, if the recipient 312 is instead a member of the "to" or "cc" field and the message is being sent to an aware message server 160, then the transmitting message server 160 does not need to prepend the Forwarded-to header.

Thus, in some examples, a first message server 160 obtains a message 152 intended for a user of a message service hosted by a second message server 160. The message 152 includes a header 310. The first message server 160 updates, based on the second message server 160, the header 310 to indicate that all intended recipients of the message 152 are declared. The message server 160 may transmit the message 152 to the second message server 160. Optionally, the first message server 160 updates the header 310 by adding a forwarded-to declaration.

Figure 4:
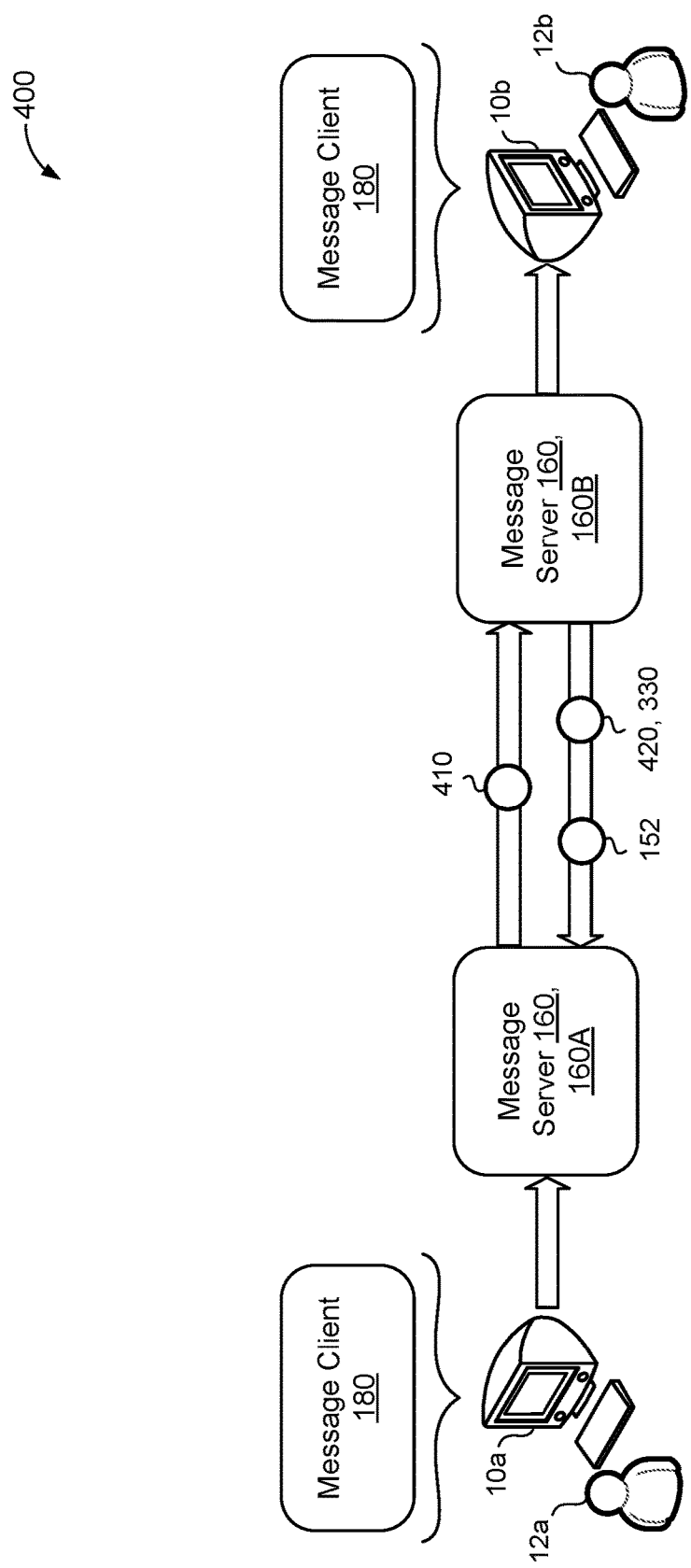
FIG. 4 is a schematic view of a challenge system for challenging a sender of a message.

Referring now to FIG. 4, in some implementations, a message server 160, 160A, after receiving a message 152, transmits a challenge request 410 to the sender (e.g., another message server 160, 160B) challenging the sender of the message 152 digitally signed the digital signature 330 of the message 152. For example, the challenge request 410 includes a token or value for the sender to digitally sign using the same private key 172PRK used to sign the digital signature 330 of the message 152. The token may contain the hash of the just sent message 152, receiving domain, and/or timestamp to bind the signature to the message 152. For example, the hash identifies the message 152, the receiving domain identifies the recipient 312, and the timestamp indicates when the transaction or message 152 occurred to prevent replay of the signing. The sender (i.e., the message server 160B in this example) transmits a challenge response 420 that includes a second digital signature 330 performed by the same private key 172PRK used to sign the digital signature 330 of the message 152. A valid challenge response 420 confirms for the message server 160A that the sender is the same entity that signed the message 152, thus greatly reducing the chances of a replay attack. That is, when the message server 160A receives, from the sender of the message 152, the challenge response 420, the message server 160A verifies that the sender of the message 152, in some implementations, is the author of the message 152. When the challenge response 420 is invalid or not provided, the message server 160A may alert the first user 12a and/or discard or quarantine the message 152. The message server 160 may issue challenge responses 420 in conjunction with the explicit declaration of recipients 312 described above (see FIGS. 1-3) or as an alternative.

Thus, the challenge protocol described herein allows the system 100 to determine and demonstrate externally that the token signer (i.e., the challenged sender) is the sender domain, and to ensure the message is not the result of a replay attack. The signature provided in the challenge response 420 ensures that a sender-receiver participated in a SMTP delivery transaction. This evidence is particularly important for generating a chain of such transactions that forms a path from the originating sender to the final receiver. Path formation may rely on recipient domain paths to detect replay attacks or other inauthentic messages 152. For example, the system 100 extends explicit recipient declaration to look for matching sender and receiver domain information. For example, the message server 160 matches a domain of an address of a declared recipient 312 (e.g., an email address) as specified by the author of the message 152 to a domain of the receiver as specified by a header of the message 152 (e.g., an ARC-Seal header).

When these domains match, the message server 160 may determine the message 152 is authentic and when they do not match the message server 160 may determine the message 152 is potentially inauthentic. Additionally or alternatively, the message server 160 employs other protections against replay attacks, such as sender Internet Protocol (IP) affirmation. In this example, the message server 160 verifies an IP address of the author (e.g., stored in the header 310 of the message) matches an IP address of the sender.

In some implementations, the system includes a sender IP affirmation approach. In these implementations, the message server 160 attempts to use the sender defined recipient domain, then use a message authentication method (e.g., sender policy framework (SPF)) with a declared list of IPs to match against for verification. An intercepted message that does not match the correct IP may be flagged (e.g., indicated as inauthentic). This technique forces a malicious actor to identify themselves in the path, which is advantageous. Thus, this technique is useful for reputation building.

Figure 5:
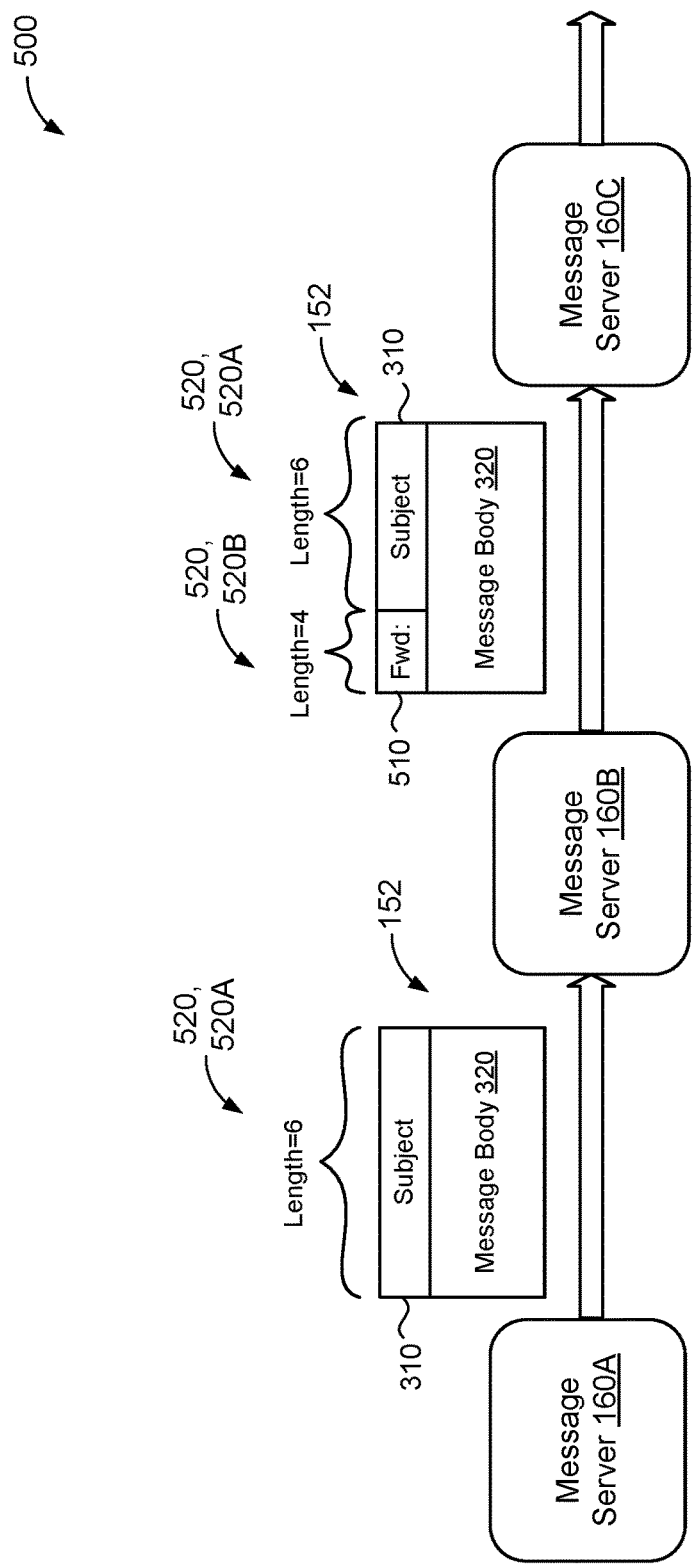
FIG. 5 is a schematic view of message headers for tracking changes to messages.

Referring now to FIG. 5, in some implementations, a recipient 312 of a message 152 performs one or more modifications to a message 152 and distributes the message 152 to subsequent recipients. For example, a message server 160 may receive a message 152, add "Fwd:" to the subject line, and distribute the message 152 to several users per a mailing list or a forwarding list. Such a modification to the subject line (or any other modifications to the subject line or body of the message 152) typically breaks DKIM and other security standards. The modification may modify a header of a message 152, a footer of the message 152, or any other portions of the message 152. To enable modifications of the message 152 while still providing authenticity verification, the message server 160 may add a modification 510 to the message 152. In some examples, the modification 510 must follow one or more rules such as the modification 510 must prepend the subject line. After adding the modification 510, the message server 160 determines a length of the modification 510. For example, the length 520 is in bytes or characters. The message server 160 then generates a second header 310 that includes the length 520 of the modification 510. The message server 160 may transmit the message 152, the first header 310, and the second header 310 to one or more recipients 312.

The message server 160 for the recipients 312, in some implementations, verifies the authenticity of the message 152 by verifying the contents of the second header 310 and then, based on the length 520, removing the modification 510 from the message 152 and verifying the contents of the original header 310. In this way, the message server may "unroll" the headers 310 and modifications and preserve the cryptographic digital signatures 330 until the original message 152 is verified authentic from the original author. The message server 160 may remove the modifications 510 from the message 152 during verification based on the established rules (e.g., modifications 510 can only be prepended to the subject line or modifications 510 can only be appended to a footer of the message 152, etc.) or based on additional contextual information in the header 310. For example, the header 310 includes an offset or other information identifying the location in the message 152 of the modification 510 in addition to or alternative the length 520 of the modification 510. The message server 160 may deliver the modified message 152 to the intended recipient(s) 312 with the modification 510 included within the message 152 (i.e., the modifications 510 are not permanently removed from the message 152).

Here, schematic view 500 includes a first message server 160A transmitting a message 152 to a second message server 160B. The message 152 includes a message body 320 and a header 310 with a subject line with a length 520, 520A of six. The second message server 160B prepends "Fwd:" to the subject line of the message 152. The "Fwd:" represents a modification 510 with a length 520, 520B of four. In this example, the second message server 160B generates another header 310 that indicates the length 520B of the modification 510 and digitally signs the new header 310. The second message server 160B then transmits the message 152 to a third message server 160C, where the process may repeat until all desired recipients 312 have received the message 152.

Some implementations herein help tolerate forwarder modification. Tolerating forwarder modification is useful when, for example, forwarders do not implement the same protocols while still providing useful validation results. In some examples, the message 152 implements Multipurpose Internet Mail Extensions (MIME) and the message server 160 adds modifications 510 to one or more MIME parts and tracks the modifications 510 in the header 310 via lengths 520 and hashes of the MIME parts. The MIME parts may form a tree structure with leaf nodes and non-leaf nodes. The header 310 may indicate the length 520 of each node, along with any other information associated with the node (e.g., hash, content type, length of children, etc.). In this way, the message server 160 can easily add multiple modifications 510 throughout the message 152 (e.g., in the body 320 of the message 152) while still allowing the end recipients 312 to verify both the authenticity of the original message 152 and the modifications 510. In some implementations, the remote system 140, message server 160, or other computing device extends similar modification tracking to HyperText Markup Language (HTML).

Figure 6:
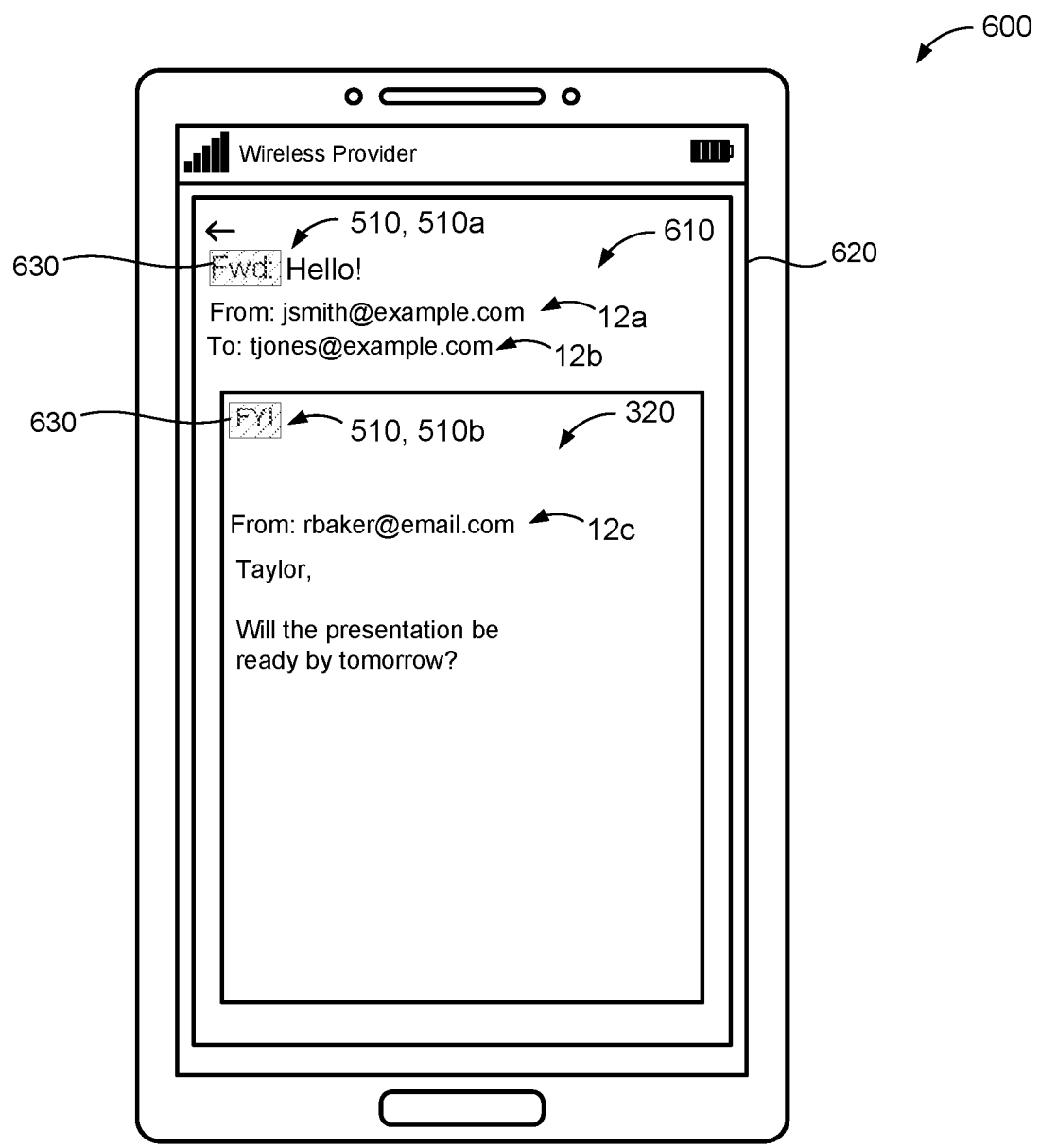
FIG. 6 is a schematic view of a user interface of a user device for tracking changes to messages.

Referring now to FIG. 6, a schematic view 600 includes the user device 10 executing a graphical user interface (GUI) 610 for display on a screen 620 of the user device 10. Here, the GUI 610 visually indicates to the user 12 of the user device 10 modifications 510 made to a message 152 received by the user 12. In this example, a first user 12a (i.e., jsmith@example.com) has forwarded a message 152 to a second user 12b (i.e., tjones@example.com) that was originally authored by a third user 12c (i.e., rbaker@example.com). Here, the first user 12a made a first modification 510, 510a that prepends "Fwd:" to the subject line of the message 152 and a second modification 510, 510b that adds "FYI" to the body 320 of the message 152. In some implementations, the GUI 610 displays one or more visual indications 630 of the modifications 510. For example, the visual indications 630 include highlighting, outlining, bolding, or any other method to draw attention and define the modifications 510. The message server 160 or the message client 180 may add the visual indications 630 to the message 152 based on the one or more headers 310 of the message 152 (i.e., by "unrolling" the modifications 510 as described above).

While implementations herein describe actions performed by a message server 160 executing at a remote system 140 and a message client 180 executing at a user device 10, this is not limiting, and any of the actions may be executed by the message server 160 and/or the message client 180. In some examples, the message server 160 executes on the user device 10. The message server 160 may communicate with other message servers 160 of other remote systems 140 (e.g., when one user 12 sends a message 152 to another user 12 that utilizes a different messaging service). In some examples, the same message server 160 transmits messages 152 between users 12 (e.g., when the users 12 share the same messaging service).

Figure 7:
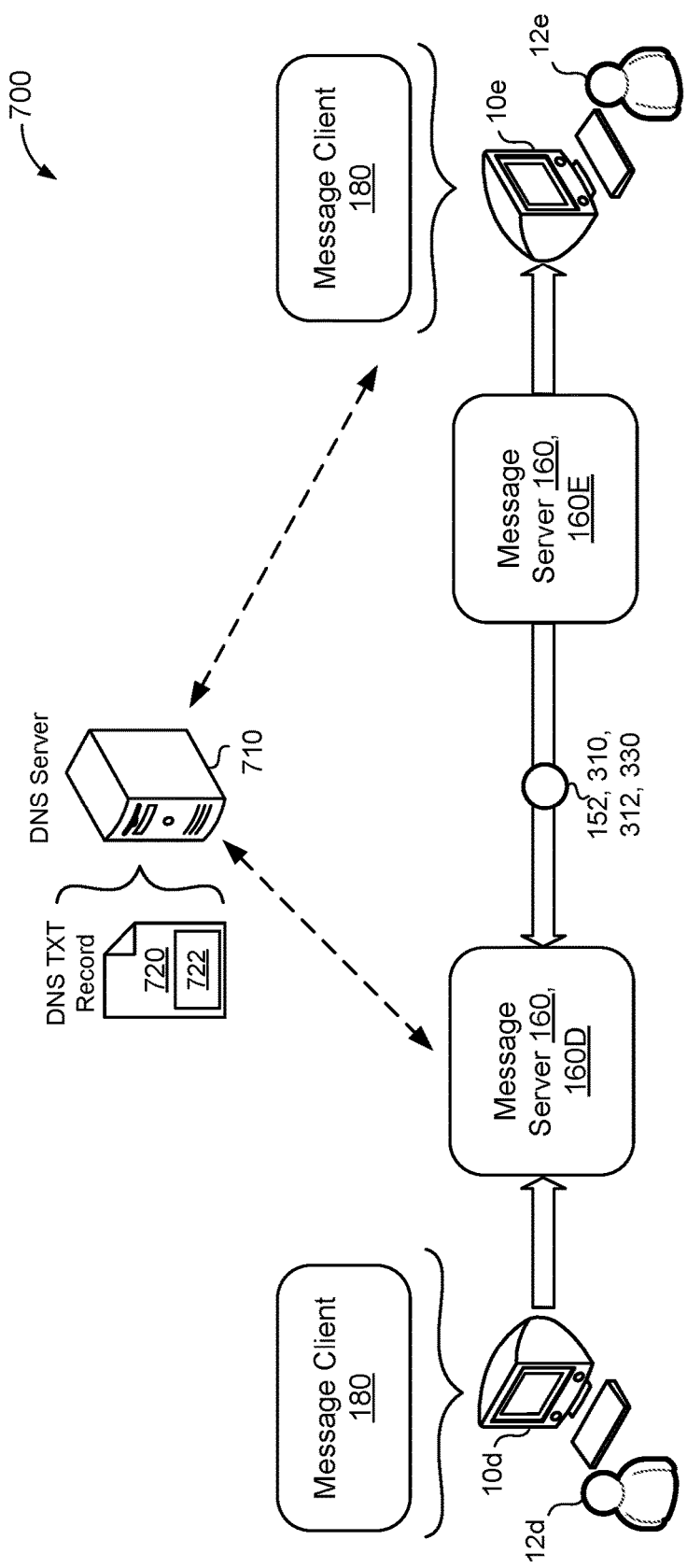
FIG. 7 is a schematic view of a DNS TXT record for tracking messages.

Referring now to FIG. 7, some message senders (e.g., users 12) may not have the resources or ability to implement or use message clients 180 and/or message servers 160 that implement the enhanced security message protocols described herein. As described below, participating message servers 160 may perform a variety of actions to account for non-participating message servers 160 and/or to encourage participation.

In some scenarios, the message senders may delegate specifications to other message servers 160 that do implement the message protocols. To this end, in some implementations, and as exemplified in schematic view 700, a first message server 160, 160D receives a message 152 for a user 12, 12d of a message service hosted by the message server 160D. The first user 12d interacts with the message service via a first user device 10, 10d. The message 152 is from a second message server 160, 160E hosting a second message service and authored by a second user 12, 12e using a second user device 10, 10e. The message 152 includes a header 310 that includes a digital signature 330 signed by the author of the message 152 and a list of one or more recipients 312 of the message 152. The first message server 160, in these implementations, determines that a DNS TXT record 720 associated with the message 152 (e.g., associated with a domain of the second user 12e) includes a delegation policy 722 indicating that the header 310 declared all intended recipients 312 of the message 152. For example, the DNS TXT record 720 includes a flag (e.g., a delegation flag) set to true or '1.' The DNS TXT record 720 may be hosted by a DNS server 710 or the like that is in communication with the first message server 160D (e.g., via the Internet).

In response to determining that the DNS TXT record 720 includes the delegation policy 722, the message server 160 determines that the digital signature 330 by the author (i.e., the second user 12b) is valid and determines, using the list of one or more recipients 312, that the user 12d is a declared recipient 312 of the message 152. In response to determining that the digital signature 330 is valid and that the user 12d is a declared recipient 312 of the message 152, the first message server 160D indicates that the message 152 is authentic. For example, the first message server 160D delivers the message 152 to the user device 10d of the user 12d. The first message server 160D, additionally or alternatively, categorizes, forwards, or otherwise handles the message 152 as if the message 152 is authentic. In this way, even when the second message server 160E is not aware or otherwise does not participate in the enhanced protocols discussed herein, the authors or senders of the message 152 may delegate (e.g., via a DNS TXT record 720) other message servers 160 that do participate to verify that recipients 312 are listed in the header 310.

When the digital signature 330 by the author of the message 152 is valid, but the user 12 is not a declared recipient 312 on the list of one or more recipients 312 of the message 152, the message server 160 may determine an indication of a replay attack. In this scenario, the first message server 160D may indicate the message is inauthentic. For example, the first message server 160D alerts the user 12d (e.g., that the message 152 may be a replay attack). In some examples, the first message server 160D quarantines the message 152 (e.g., by routing the message 152 to a spam folder or otherwise designating the message 152 as inauthentic and/or spam) or delivers the message 152 with a warning or notification of the potential danger. In other examples, the first message server 160D discards the message 152 entirely. Additionally or alternatively, the first message server 160D flags the message 152, categorizes the message 152, or any other action that indicates the message 152 is or may be inauthentic.

In some implementations, when a first message server 160 receives a message 152 from a second message server 160 that is not aware or does not participate in the enhanced security protocols discussed herein, the first message server 160 may indicate, via an ARC header 310 (e.g., an ARC-Seal header), that the second message server 160 fails to declare all recipients 312 of messages 152 processed by the message server 160.

This allows participating message servers 160 to build a sender signature affirmation (SSA) chain even when some message servers 160 in the chain do not participate in the enhanced protocol schemes. That is, participating message server 160 may provide information about "adjacent" (i.e., adjacent in the chain) non-participating or naive message servers 160. The information may include SPF purported responsible address (PRA) domain. The information may be included as part of the SSA chain information and simultaneously define the appropriate message servers 160 as non-participating. For example, participating message servers 160 use ARC domain paths (ADPs) to specify non-participating message servers 160 to help reconstruction of the SSA chain. For example, a non-participating message server 160 is designated by the recipient address by the fully qualified domain name (FQDN).

Bulk senders and other business-to-consumers (B2C) senders typically send messages (e.g., emails) directly to their users. In some implementations, a message server 160 modifies a domain-based message authentication, reporting and conformance (DMARC) policy so that direct flows are designated and indirect flows may have policies applied to them. To designate a direct flow, both DKIM and SPF email authentication must both pass, and the authenticated domain must align. To increase the applicability, the policy may specify which domains they must align to. If flows are indirect, a policy may be applied to them. An indirect flow means that only one of DKIM or SPF has passed or, if both have passed, both DKIM and SPF are not in alignment to the DMARC RFC822 from or sending domain. The policy could be to reject, quarantine, or apply new policies which are to optionally deliver with best effort, but when a replay attack is suspected, to apply a reject or quarantine policy. This helps increase coverage of senders that would be considered aligned for both SPF and DKIM and thereby direct forwarding flows.

That is, in some implementations, a first message server 160 receives, from a second message server 160, a message 152 for the user of the message service hosted by the first message server. The message server 160 may determine that the message 152 is an indirect message (e.g., by determining a misalignment between a DKIM authentication and an SPF authentication) and, responsive to determining that the message 152 is an indirect message, the message server 160 may apply an indirect message policy to the message. The indirect message policy may include one of rejecting the second message or quarantining the second message.

Optionally, a message server 160 initializes the reputation of a new sender via certificates containing third party validated information. For example, an X.509 field describes the purpose of the sender such as a mailbox provider, inbound gateway, or bank, and then be used to initialize reputation. This information may be used as an identity to link together certificates and sending domains so that prior reputation on one domain can be linked to another domain (e.g., an uninitialized domain). The certificate, in some examples, includes the sender's domain and the public key used for DKIM signing (using conventional DKIM or as described herein). Such a certificate may be directly placed in a DKIM TXT record as a new tag (e.g., "xloc="). The value may include a URL where the certificate may be fetched from. For example, the certificate is fetched via TLS 1.2.

Referring back to FIG. 1, based on this, in some implementations, a first message server 160 receives, from a second message server 160, a message 152 for a user 12 of a message service hosted by the first message server 160. The first message server 160 may retrieve domain information 154 associated with the second message server 160 and determine that the message 152 is authentic based on the domain information 154. In some of these implementations, the first message server 160 retrieves the domain information 154 by retrieving a public key certificate 156 associated with the second message server 160. Optionally, the domain information 154 includes a threshold message recipient quantity 158, and the first message server 160 determines that the message 152 is authentic based on determining that a quantity of recipients receiving the message 152 satisfies the threshold message recipient quantity 158. That is, if a domain is well known for sending large numbers of legitimate messages 152 (e.g., the domain belongs to a large and/or well-known business), the threshold message recipient quantity may be in range that approximates the number of messages 152 the domain typically sends. For example, if a domain regularly sends 100,000 messages 152 every week to a mailing list, the threshold message recipient quantity may be greater than 90,000 and less than 110,000. Quantities outside of that range may indicate a DKIM replay attack.

Figure 8:
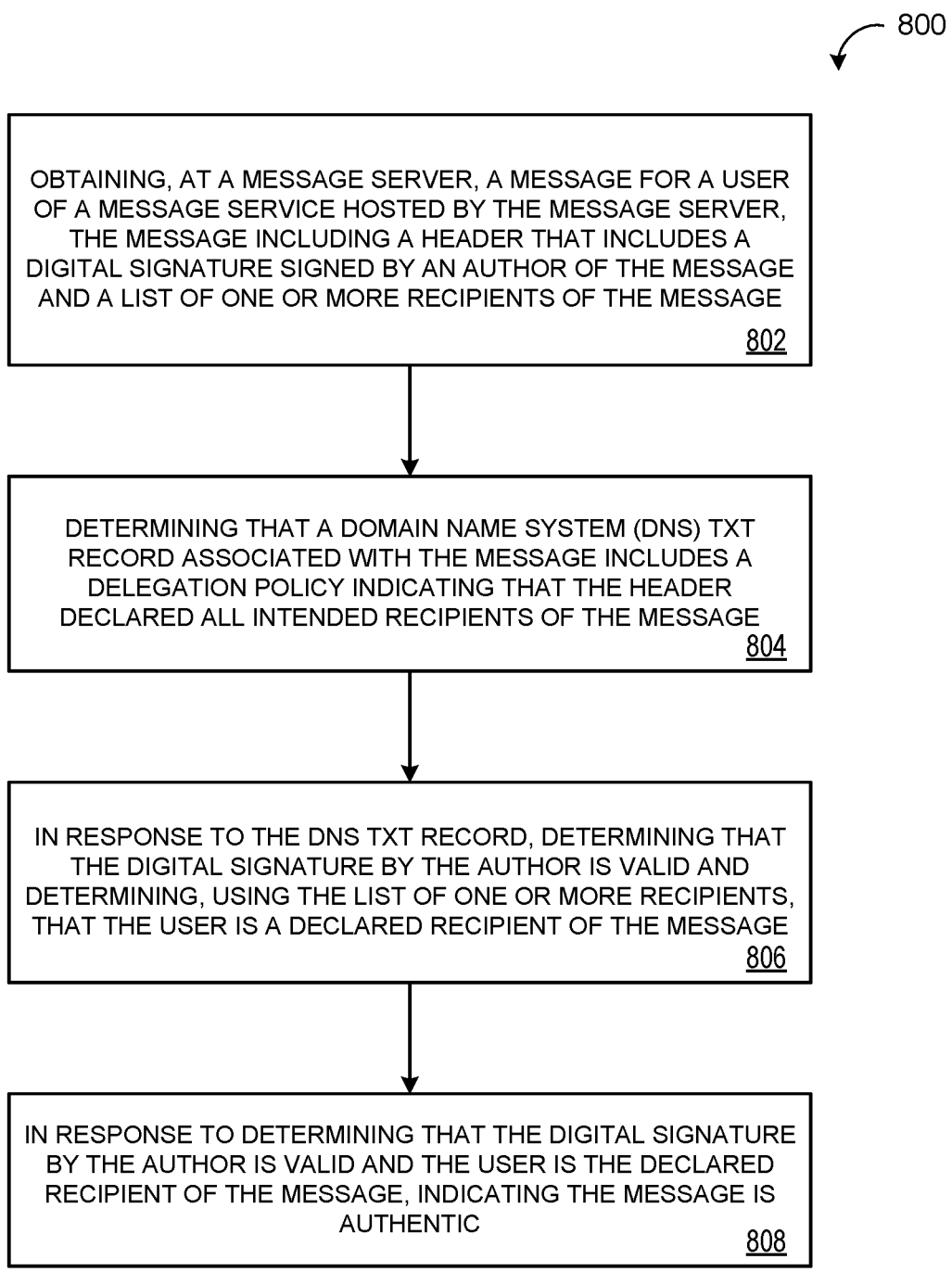
FIG. 8 a flowchart of an example arrangement of operations for a method of securing messages.

FIG. 8 is a flowchart of an exemplary arrangement of operations for a computer-implemented method 800 of securing messages. The method 800, at operation 802, includes obtaining, at a first message server 160, a message 152 for a user 12 of a message service hosted by the first message server 160. The message 152 is from a second message server 160 hosting a second message service. The message 152 includes a header 310, and the header includes a digital signature 330 signed by an author of the message 152 and a list of one or more recipients 312 of the message 152. The method 800, at operation 804, includes determining that a Domain Name System (DNS) TXT record 720 associated with the message includes a delegation policy 722 that indicates that the header 310 declared all intended recipients 312 of the message 152. In response to determining that the DNS TXT record 720 includes the delegation policy 722, the method 800, at operation 806, includes determining that the digital signature 330 by the author is valid and determining, using the list of one or more recipients 312, that the user 12 is a declared recipient 312 of the message 152. In response to determining that the digital signature 330 by the author is valid and the user 12 is the declared recipient 312 of the message 152, the method 800, at operation 808, includes indicating the message 152 is authentic.

Figure 9:
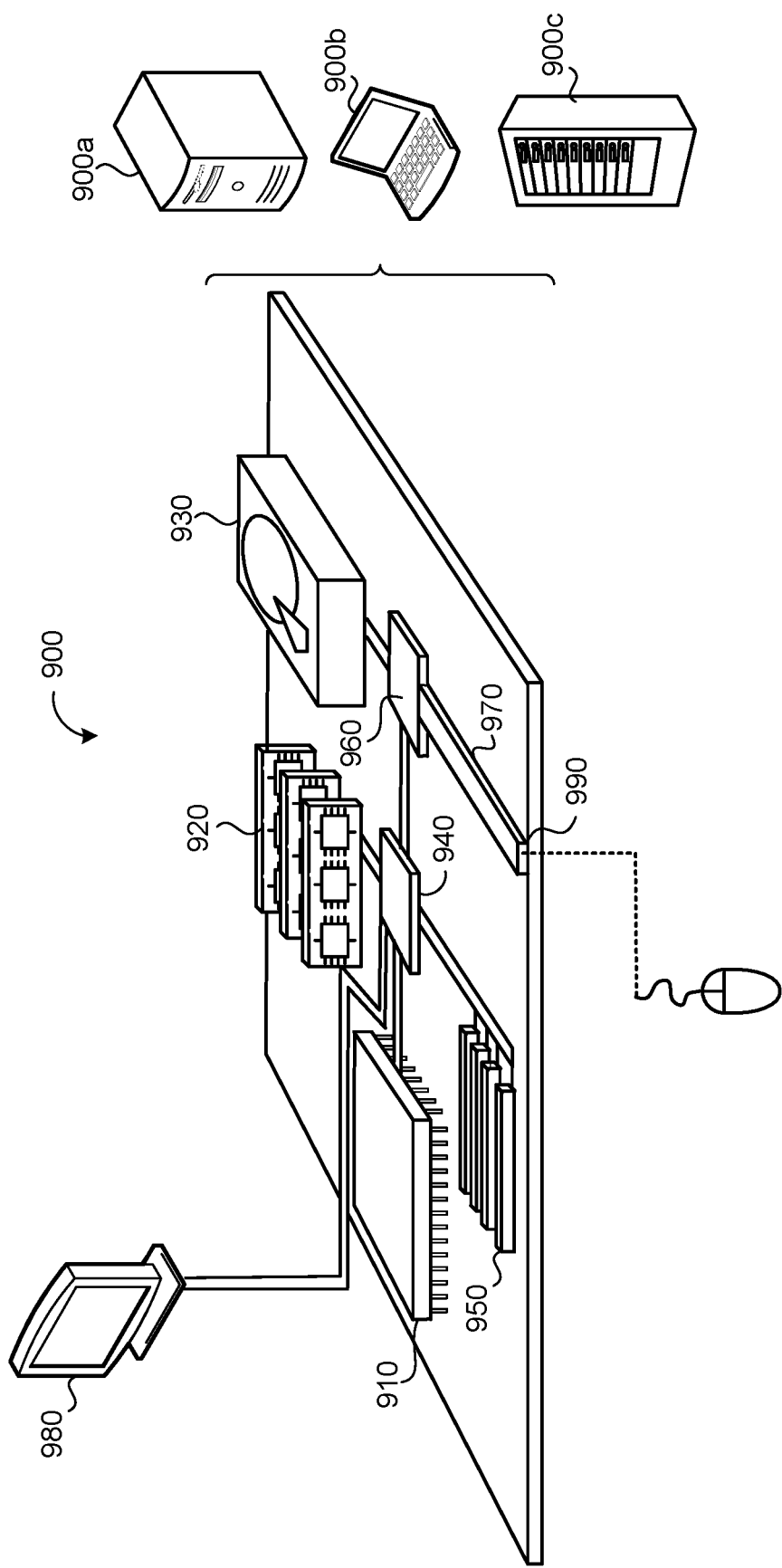
FIG. 9 is a schematic view of an example computing device that may be used to implement the systems and methods described herein.

FIG. 9 is a schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
    obtaining, at a first message server, a message for a user of a message service hosted by the first message server, the message from a second message server hosting a second message service, the message comprising a header, the header comprising:
        a digital signature signed by an author of the message; and
        a list of one or more recipients of the message;
    determining that a Domain Name System (DNS) TXT record associated with the message comprises a delegation policy indicating that the header declared all intended recipients of the message;
    in response to determining that the DNS TXT record comprises the delegation policy:
        determining that the digital signature by the author is valid; and
        determining, using the list of one or more recipients, that the user is a declared recipient of the message; and
    in response to determining that the digital signature by the author is valid and the user is the declared recipient of the message, indicating the message is authentic.

2. The method of claim 1, wherein the operations further comprise:
    obtaining, at the first message server, a second message intended for a second user of a third message service hosted by a third message server;
    indicating, via an Authenticated Received Chain (ARC) header, that the third message server fails to declare all recipients of messages; and
    transmitting the second message to the third message server.

3. The method of claim 1, wherein the operations further comprise:
    receiving, at the first message server, from a third message server, a second message for the user of the message service hosted by the first message server;
    determining that the second message is an indirect message; and
    responsive to determining that the second message is an indirect message, applying an indirect message policy to the second message.

4. The method of claim 3, wherein determining that the second message is an indirect message comprises determining a misalignment between a DomainKeys Identified Mail (DKIM) authentication and a sender policy framework (SPF) authentication.

5. The method of claim 3, wherein the indirect message policy comprises one of:
    rejecting the second message; or
    quarantining the second message.

6. The method of claim 1, wherein the operations further comprise:
    obtaining, at the first message server, a second message intended for a second user of a third message service hosted by a third message server, the second message comprising a second header;
    updating, based on the third message server, the second header to indicate that all intended recipients of the second message are declared; and
    transmitting the second message to the third message server.

7. The method of claim 6, wherein updating the second header comprises adding a forwarded-to declaration.

8. The method of claim 1, wherein the operations further comprise:
    receiving, at the first message server, from a third message server, a second message for the user of the message service hosted by the first message server;
    retrieving domain information associated with the third message server; and
    determining that the second message is authentic based on the domain information.

9. The method of claim 8, wherein retrieving the domain information comprises retrieving a public key certificate associated with the third message server.

10. The method of claim 9, wherein:
    the domain information comprises a threshold message recipient quantity; and
    determining that the second message is authentic comprises determining that a quantity of recipients receiving the second message satisfies the threshold message recipient quantity.

11. A system comprising:
    data processing hardware; and
    memory hardware in communication with the data processing hardware, the memory hardware storing instructions that when executed on the data processing hardware cause the data processing hardware to perform operations comprising:
obtaining, at a first message server, a message for a user of a message service hosted by the first message server, the message from a second message server hosting a second message service, the message comprising a header, the header comprising:
a digital signature signed by an author of the message; and
a list of one or more recipients of the message;
determining that a Domain Name System (DNS) TXT record associated with the message comprises a delegation policy indicating that the header declared all intended recipients of the message;
in response to determining that the DNS TXT record comprises the delegation policy:
determining that the digital signature by the author is valid; and
determining, using the list of one or more recipients, that the user is a declared recipient of the message; and
in response to determining that the digital signature by the author is valid and the user is the declared recipient of the message, indicating the message is authentic.

12. The system of claim 11, wherein the operations further comprise:
obtaining, at the first message server, a second message intended for a second user of a third message service hosted by a third message server;
indicating, via an Authenticated Received Chain (ARC) header, that the third message server fails to declare all recipients of messages; and
transmitting the second message to the third message server.

13. The system of claim 11, wherein the operations further comprise:
receiving, at the first message server, from a third message server, a second message for the user of the message service hosted by the first message server;
determining that the second message is an indirect message; and
responsive to determining that the second message is an indirect message, applying an indirect message policy to the second message.

14. The system of claim 13, wherein determining that the second message is an indirect message comprises determining a misalignment between a DomainKeys Identified Mail (DKIM) authentication and a sender policy framework (SPF) authentication.

15. The system of claim 13, wherein the indirect message policy comprises one of:
rejecting the second message; or
quarantining the second message.

16. The system of claim 11, wherein the operations further comprise:
obtaining, at the first message server, a second message intended for a second user of a third message service hosted by a third message server, the second message comprising a second header;
updating, based on the third message server, the second header to indicate that all intended recipients of the second message are declared; and
transmitting the second message to the third message server.

17. The system of claim 16, wherein updating the second header comprises adding a forwarded-to declaration.

18. The system of claim 11, wherein the operations further comprise:
receiving, at the first message server, from a third message server, a second message for the user of the message service hosted by the first message server;
retrieving domain information associated with the third message server; and
determining that the second message is authentic based on the domain information.

19. The system of claim 18, wherein retrieving the domain information comprises retrieving a public key certificate associated with the third message server.

20. The system of claim 19, wherein:
the domain information comprises a threshold message recipient quantity; and
determining that the second message is authentic comprises determining that a quantity of recipients receiving the second message satisfies the threshold message recipient quantity.

* * * * *